April 4, 1961  E. D. JONES  2,978,042
HARROW DRAG CART
Filed Aug. 22, 1957  2 Sheets-Sheet 1

INVENTOR
ELDON D. JONES
Williamson, Schroeder, Adams & Meyers
ATTORNEYS

April 4, 1961 E. D. JONES 2,978,042
HARROW DRAG CART

Filed Aug. 22, 1957 2 Sheets-Sheet 2

INVENTOR
ELDON D. JONES
Williamson, Schroeder, Adams & Meyers
ATTORNEYS

United States Patent Office 2,978,042
Patented Apr. 4, 1961

2,978,042

HARROW DRAG CART

Eldon D. Jones, Rte. 1, Lake Crystal, Minn.

Filed Aug. 22, 1957, Ser. No. 679,661

2 Claims. (Cl. 172—323)

This invention relates to harrow drag carts of the type to be attached to and drawn by tractors and more specifically relates to a harrow drag cart upon which the harrow sections may be supported and positioned within small compass to facilitate ready and easy storage and transport thereof.

Although folding harrow drag carts have been known in different forms in the past, all of such drag carts with the harrows thereon occupy a substantial space, even when the harrow sections and drag cart are in inwardly folded condition. As a result, such harrow drag carts defeat their general purpose at the outset.

An object of my invention is to provide a new and improved harrow drag cart of simple and inexpensive construction and operation which is foldable into small compass to facilitate ready and easy storage and transport of multiple section harrows.

Another object of my invention is the provision of a novel multiple harrow section-carrying drag cart which is foldable to position the multiplicity of harrow sections in overlapped and juxtaposed relation to each other so as to orient the harrow sections in the smallest possible area to facilitate ready and easy storage thereof.

A further object of my invention is to provide a multiple harrow section-carrying drag cart which, in storage position, carries the harrow sections in upright, overlapped, and juxtaposed relation with relation to each other and wherein the forward tongue structure of the apparatus is also oriented in a vertical position closely adjacent the harrow sections, whereby, in storage, the drag cart will occupy the smallest possible space.

A still further object of my invention is to provide a new and novel multiple section-carrying drag cart wherein the harrow section draw bars may be vertically adjusted for floating just above the ground surface in field position and may be moved upwardly into spaced relation with the ground in transport position when the harrow sections are supported on the drag cart well above the ground surface.

These and other objects and advantages of my invention will more fully appear from the following description made in connection with the accompanying drawings wherein like reference characters refer to the same or similar parts throughout the several views and in which.

Figure 1:
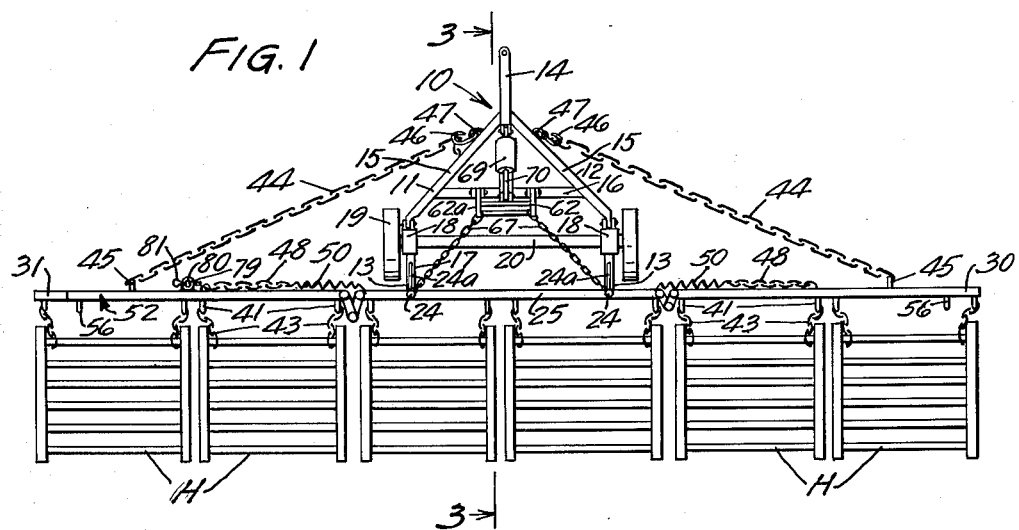
Fig. 1 is a top plan view of the drag cart in open condition.

The harrow drag cart as indicated in general by numeral 10 includes a supporting structure 11 which has a forward end portion 12 and a rear end portion 13. The forward end portion 12 of the supporting structure includes a tongue 14, a pair of forwardly convergent frame members 15 which are welded to the tongue 14, and a cross brace 16 between the frame elements 15 and welded thereto and affixed as by welding to the rear end of the tongue 14. The rear end portion 13 of the supporting structure includes a pair of fore-and-aft frame elements 17 in substantially end-to-end relation with the frame elements 15. The rear ends of the frame elements 17 are bent downwardly and extend into proximity with the ground surface. Wheel mountings 18 are affixed on the frame elements 17 as by welding, and carry the ground-engaging support wheels 19 thereon. A cross brace 20 extends between the wheel mountings 18 and is affixed thereto as by welding. The forward end portion 12 and the rear end portion 13 of the supporting structure are swingably connected with each other as by bolts 21 to facilitate relative swinging between the forward and rear end portions of the supporting structure about an axis which extends parallel to the wheel axes. Upward swinging of the tongue 14 into the dotted position B is thereby facilitated, and furthermore, when the tongue 14 is held in stationary position as by the tractor T, partially shown in Fig. 3, the rear end portions of the rear frame elements 17 may be vertically oscillated.

An upright, transversely extending harrow section-supporting framework 22 is affixed on the rear portion 13 of the supporting structure, and a harrow section draw bar 23 is also affixed below the framework 22. In the form shown, the draw bar 23 is constructed of rigid tubing and is welded to the rear ends of the frame elements 13. The framework 22 includes a pair of upright posts 24 constructed of rigid tubing, which are affixed as by welding to the draw bar 23, and a top cross bar 25 which is welded to the posts 24 above the draw bar 23. The posts 24 are also braced by elements 24a. The top cross bar 25 is also constructed of rigid tubing. The top cross bar 25 and the draw bar 23 have telescoping extension elements 26 and 27 respectively in the opposite ends thereof which are secured in the desired positions by set screws 28. Rigid upright end posts 29 are welded to the extension elements 26 and 27 at each end of the framework 22.

Additional harrow section draw bars 30 and 31 are disposed in substantially end-to-end relation with the opposite ends of draw bar 23, and are constructed of rigid tubing. The draw bars 30 and 31 are provided with telescoping extension elements 32 at their inner ends which are adjustably affixed to the draw bars as by set screws 33. Means are provided for swingably connecting the draw bar 23 to permit swinging of the draw bars 30 and 31 rearwardly into overlapped and juxtaposed relation to each other and to the draw bar 23, and to permit only limited forward swinging of the draw bars 30 and 31, and to further permit vertical swinging oscillation of the draw bars 30 and 31 with respect to the draw bar 23. In the form shown, such means include rearwardly projecting apertured ears 34 and 35 at the opposite ends of the draw bar 23 and affixed as by welding to the extension elements 27. A mounting bracket 36 has a bifurcated outer end portion 37 disposed on opposite sides of the extension element 32 and has a horizontally extending pivot bolt 38 extending through suitably provided apertures therein and in the extension element 32. Vertically oriented pivot bolts 39 extend through the apertured ears 34 and 35 and swingably carry the looped inner ends 40 of the brackets 36. It is to be particularly noted that the ears 34 and 35 are similar in construction, except that the ears 35 project outwardly from the draw bar 23 a distance greater than do ears 34 so as to locate the pivot bolt 39 therein outwardly further from the draw bar 23 than the bolt carried by ear 34. The draw bar 30 may then be swung rearwardly and into juxtaposition with the draw bar 23, and subsequently the draw bar 31 may be swung rearwardly and into overlapped relation with the draw bar 30. The draw bars 23, 30 and 31, although in the same horizontal plane, will thereby be disposed in closely spaced, but non-interfering relation with respect to each other. It will be noted that the outer bifurcated end portion 37 is disposed in closely spaced, but engageable relation at 37a with the end of draw bar 23. Forward swinging of the additional draw bars 30 and 31 with respect to draw bar 23 is thereby precluded.

The draw bars 23, 30 and 31 are provided with means for attachment to the harrow sections H, and in the form shown, such means include straps 41 encircling the draw bars and having the ends connected by bolts 42 to which the harrow chains 43 are connected.

Means are provided for normally retaining the draw bars 30 and 31 in substantially end-to-end relation with the draw bar 23 when the drag cart 10 is in field position. In the form shown, such means include a pair of chains 44 which is connected to the draw bars 30 and 31, and slightly inwardly from their outer ends as by straps 45, and are also connected to chain hooks 46 which are carried by mounting eyes 47 on the forward portion of the supporting structure. When the draw bars 30 and 31 are to be swung into overlapped and juxtaposed relation with each other, chains 44 may be released from the hooks 46.

Means are provided for suspending the draw bars 30 and 31 to retain the same at predetermined elevations with respect to the ground surface. In the form shown, such means include chains 48 connected to ears 49 which are welded to the draw bars 30 and 31 intermediate the ends thereof. The upper ends of chains 48 are connected to tension springs 50, and the springs 50 are hooked to the upper ends of the end posts 29. The draw bars 30 and 31 will thereby be suspended in predetermined relation with respect to the ground surface and in substantial alignment with the draw bar 23.

Figure 2:
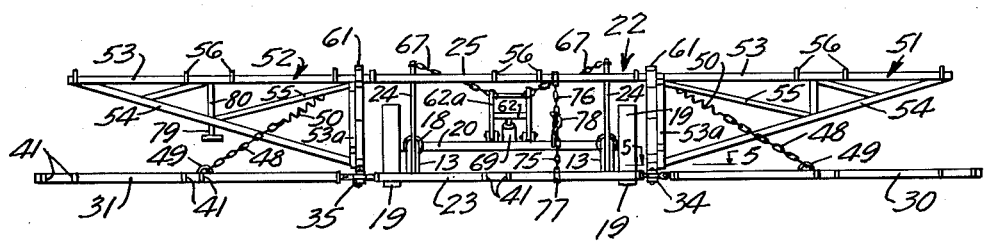
Fig. 2 is an elevation view of the rear of the drag cart in open condition and wherein the harrow sections are removed.
Figure 5:
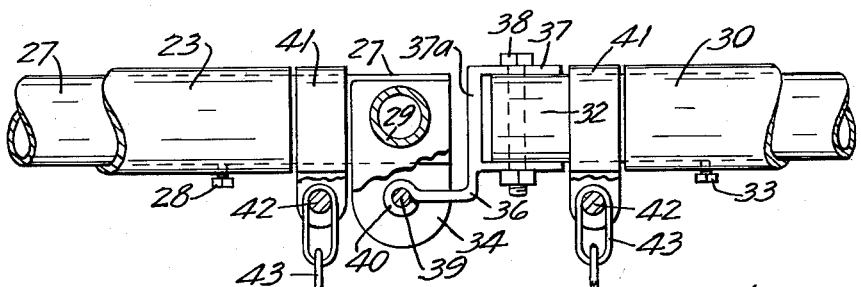
Fig. 5 is a detail section view taken in an enlarged scale and on a plane as indicated substantially at 5—5 of Fig. 2.
Figure 3:
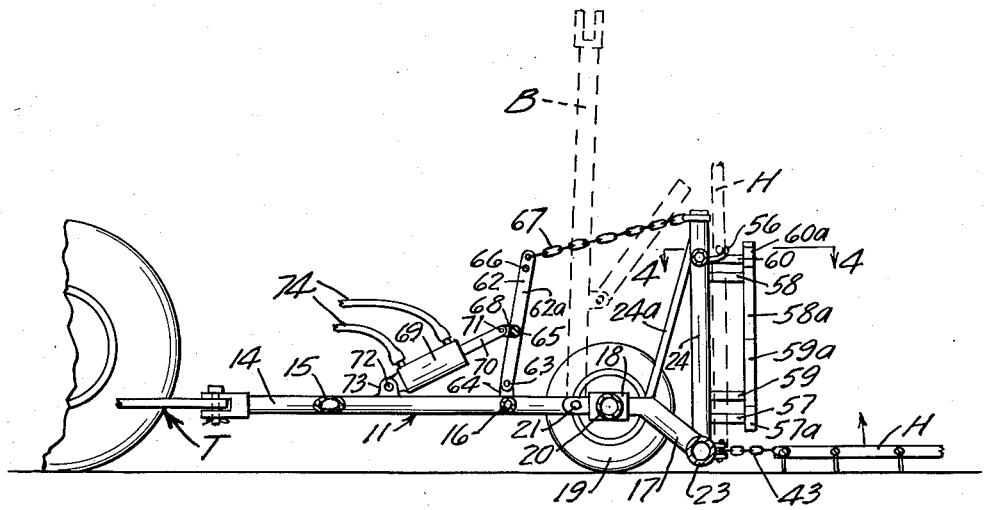
Fig. 3 is a section view in an enlarged scale and taken on a substantially vertical plane as indicated at 3—3 in Fig. 1.
Figure 4:
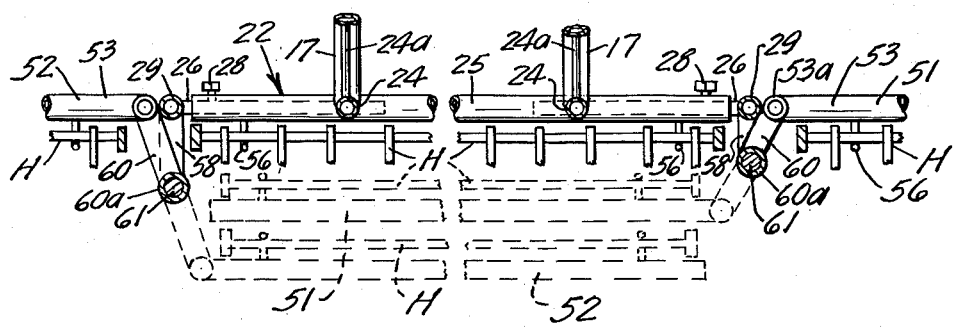
Fig. 4 is a detail section view in an enlarged scale of the harrow section-supporting framework and hinging portions for carrying the gates and wherein the section is taken on a substantially horizontal plane as indicated at 4—4 of Fig. 3.

Means are provided for suspending the harrow sections in vertical positions on the drag cart and to permit folding of the harrow sections normally being dragged by the draw bars 30 and 31, into overlapped and juxtaposed relation with respect to each other and within the ends of the framework 22. In the form shown, such means include a pair of harrow section-supporting gates 51 and 52. Each of the gates 51 and 52 has a top cross bar 53 and a diagonal bottom brace 54 and connecting struts 55, all of which are welded into an integral one-piece construction. When the gates 51 and 52 are in outwardly extending position, as seen in Fig. 2, the top cross members 53 are in substantial alignment with the top cross member 25 of the framework 22. A plurality of hooks 56 are affixed as by welding to the top cross members 53 and 25 of the gates 51 and 52 and of the framework 22 respectively for suspending the harrow sections H in vertically oriented position thereon, substantially as seen in Fig. 4 and in dotted lines in Fig. 3.

Means are provided for swingably interconnecting the gates 51 and 52 with the framework 22 to permit only rearward swinging of the gates into overlapped and juxtaposed relation with the framework 22. In the form shown, such means include a hinging and spacing structure at each end of the framework 22. A pair of elongated mounting elements 57 and 58 are welded in vertically spaced relation to the end posts 29. A pair of elongated rigid elements 59 and 60 are welded to the inner end posts 53a of the gate sections 51 and 52. Elements 57, 58, 59 and 60 have pivot bolt-receiving sleeves 57a, 58a, 59a and 60a thereon in alignment with each other. The pivot bolt 61 projects through the aligned sleeves to facilitate swinging of the gates thereon with respect to the framework 22.

It is to be particularly noted that the elements 57–60, which form parts of the hinge mechanism between gate 52 and framework 22, are substantially longer than the elements 57–60 which form a part of the hinge mechanism between the gate 51 and framework 22. Therefore, as best seen in Fig. 3, when the gates 51 and 52 are swung into juxtaposition with the framework 22, the gates will be in overlapping but spaced relation with respect to each other with sufficient space between themselves and the framework 22 so as to permit the harrow sections H to be confined therebetween.

The drag cart is also provided with means for producing relative swinging movement between the front and rear end portions 12 and 13 of the supporting structure 11. In the form shown, such means include an upright swingable H-shaped frame 62, the upright side elements 62a of which are swingably connected by pivot bolts 63 to upstanding ears 64 which are welded on the cross brace 16. The H-frame has a central cross bar 65 and also has an upper cross brace 66. The upper ends of the side members 62 are connected by chains 67 to the top ends of the posts 24 of the frame structure 22. The central cross bar 65 of the H-frame 62 has a pair of apertured ears 68 welded thereto and a hydraulic cylinder 69 has its piston rod 70 swingably connected as by bolt 71 to the ears 68. The other end of cylinder 69 is swingably connected by means of a pivot bolt 72 to apertured ears 73 which are welded onto the tongue 14. The hydraulic cylinder 69 is of the double-acting type and is provided with hydraulic fluid hoses 74 which may be connected to the hydraulic pumping and control system of the tractor T. It will be seen that when the piston rod 70 of the hydraulic cylinder 69 is retracted the H-frame 62 will be swung forwardly and the upright framework 22 will also be tilted forwardly. The forward and rear portions 12 and 13 of the supporting structure will oscillate about the pivot bolt 21.

Means are provided for maintaining the gates 51 and 52 in inwardly swung position when the harrow sections H are carried thereon so as to maintain the drag cart in folded condition and the gates are also retained in folded condition when the harrows are on the ground in field position. In the form shown, such means include a pair of chains 75 and 76 which are respectively secured to the draw bar 23 and the upper cross bar 25 as by straps 77 which are substantially identical to the straps 41. The chains are adjustably interconnected by means of a tension-producing fastener 78 such as the type which is swung overcenter into locking position as is commonly used in logging chains and the like.

A supporting leg is provided for at least partially supporting the harrow sections during storage. The leg 79 is carried in a sleeve 80 which is welded in upright position on the gate 52. Leg 79 has a plurality of apertures therein which are alignable with corresponding apertures in the sleeve 80 to receive the chain 81 therethrough, whereby to hold the leg in the desired upwardly disposed or downwardly disposed ground-engaging positions.

The operation of the drag cart will be clear from the description of the mechanism. In summary it should be understood that the hydraulic cylinder 69 may be operated for tilting the framework 22 and raising and lowering the draw bar 23. When the harrows are in field position as shown in Fig. 1, the draw bars will be lowered substantially to the ground level. When the harrows are to be transported to a different location, the gates 51 and 52 are swung to the position shown in Fig. 2 and the harrow sections will thereupon be lifted onto the hooks 56 to be suspended from the tops of the gates 51 and 52 and the framework 22. The chains 44 will be released and the springs 50 will be unhooked from the posts 29 and then the gate 51 and draw bar 30 will be swung rearwardly into juxtaposition with the framework 22. When in this position, the chain 48 may be hooked over one of the harrow teeth on the framework 22 to hold the draw bar 30 off the ground. Subsequently the gate 52 and the draw bar 31 are swung rearwardly into juxtaposition with the framework 22 and in overlapping relation with the gate 51 and the harrow section thereon.

The chains 75 and 76 will be wrapped around the gates 51 and 52 and will be fastened together to hold the gates in their folded position. The hydraulic cylinder 69 may be operated to tilt the framework 22 forwardly and to raise the draw bars into spaced relation with the ground surface.

When use of the harrow has been completed for the year, the harrow sections will be left in vertical position on the drag cart and the gates will remain in inwardly swung condition so that the harrow sections occupy the smallest possible space. The hydraulic cylinder will be operated to lower the draw bar 23 toward the ground surface until the supporting leg 79 which has been lowered to its ground-engaging position, engages the supporting surface. The hydraulic cylinder will normally be removed from the mechanism during storage. The tongue 14 will be swung upward into the dotted position B shown in Fig. 3. It will therefore be seen that the drag cart occupies the smallest possible space for ready and easy storage.

It will be seen that I have provided a new and improved multiple harrow section-carrying drag cart which is foldable into small compass for ready and easy transporting and storing the harrow sections in the smallest possible area.

It will, of course, be understood that various changes may be made in the form, detail, arrangement and proportion of the parts without departing from the scope of my invention which consists of the matter described herein and set forth in the appended claims.

What I claim is:

1. A drag cart for use with harrow sections, comprising a mobile supporting structure having a forward portion and also having a rear end portion, said rear end portion including an upright and transversely extending harrow section-supporting framework thereon, a substantially stationary draw bar extending transversely of the supporting structure and being secured to the supporting structure below said framework, pivot means interconnecting said forward and rear portions of the supporting structure and permitting tilting of said framework about a transversely extending axis to raise and lower said stationary drawbar, adjustable means connected with said front and rear portions and controlling tilting of the framework, a swingable drawbar in substantially end-to-end relation with said stationary drawbar, means swingably interconnecting the adjacent ends of said draw bars for swinging movement in a substantially horizontal plane whereby to permit swinging of the swingable draw bar into juxtaposition with said stationary draw bar, releasable means restraining rearward swinging movement of the swingable draw bars with respect to said one draw bar, a harrow section-supporting gate extending outwardly from said framework in substantially end-to-end relation therewith, means swingably interconnecting said gate with said framework and permitting rearward swinging of the gate about an upright axis and into spaced relation and juxtaposition with said framework, and means on said framework and on said gate for suspending harrow sections in upright positions thereon, whereby to permit folding of the drag cart and harrow sections into small compass for transport along a highway and storage.

2. A drag cart for use with harrow sections comprising a mobile supporting structure having a rear end portion with an upright and transversely extending harrow section-supporting framework thereon, a first draw bar secured on the supporting structure and below said framework, additional draw bars at the opposite ends of said first draw bar and in substantial alignment therewith, means swingably connecting said additional draw bars with said first draw bar for rearward swinging movements into juxtaposition with said first draw bar, means interconnecting the drawbars with harrow sections, releasable means connecting said additional draw bars with the supporting structure and preventing rearward swinging of the additional draw bars, a pair of harrow section-supporting gates at the opposite ends of the framework and in substantially end-to-end relation therewith, hinge means connecting said gates with the opposite ends of the framework for rearward swinging about upright axes into spaced relation and juxtaposition with the framework, said hinge means spacing the gates differently with respect to each other from the framework when the gates are in juxtaposition therewith, means on the framework and gates for suspending harrow sections in upright positions thereon, and means releasably securing the gates and harrow sections to the framework and in juxtaposition therewith, whereby to permit the harrow sections when supported on the framework and gates to be swung into overlapping relation with each other rearwardly of the framework.

References Cited in the file of this patent
UNITED STATES PATENTS

| | | |
|---|---|---|
| 1,715,063 | Endres | May 28, 1929 |
| 2,325,882 | Scarlett | Aug. 3, 1943 |
| 2,706,880 | Steuerwald | Apr. 26, 1955 |
| 2,750,724 | Stephenson | June 19, 1956 |